United States Patent [19]
Holmqvist

[11] 3,971,118
[45] July 27, 1976

[54] METHOD OF MAKING A COMPOSITE BAKING MOLD

[76] Inventor: Magnus Allan Holmqvist, Amanuensvagen 2-114, S-104 05 Stockholm, Sweden

[22] Filed: Dec. 9, 1974

[21] Appl. No.: 531,003

[30] Foreign Application Priority Data
Dec. 13, 1973 Sweden .............................. 7316830

[52] U.S. Cl. ................................. 29/412; 29/416; 29/417; 29/DIG. 47; 249/160; 249/168
[51] Int. Cl.² ........................................ B23P 17/00
[58] Field of Search ............ 29/412, 416, 417, 526, 29/DIG. 47; 249/160, 168

[56] References Cited
UNITED STATES PATENTS

| | | | |
|---|---|---|---|
| 795,298 | 7/1905 | McCaughey | 249/168 |
| 1,497,033 | 6/1924 | Sinclair | 249/168 |
| 2,326,546 | 8/1943 | McDonald | 249/168 X |
| 2,583,870 | 1/1952 | Nafziger | 249/160 |
| 3,344,502 | 10/1967 | Maier | 29/417 |
| 3,877,134 | 4/1975 | Shanahan | 29/DIG. 47 X |

Primary Examiner—Victor A. DiPalma
Attorney, Agent, or Firm—Ladas, Parry, Von Gehr, Goldsmith & Deschamps

[57] ABSTRACT

A composite baking mold comprising a plurality of individual mold spaces is made by extruding elongated portions of aluminum or other light metal and cutting off the portions perpendicularly to their longitudinal axes and assembling the cut components by welding or riveting to form lengthwise and cross-width components defining the partial molds of the composite mold.

8 Claims, 6 Drawing Figures

METHOD OF MAKING A COMPOSITE BAKING MOLD

The present invention relates to composite baking molds having a plurality of individual mold spaces. In prior-art methods of manufacturing such molds the various partial molds forming the molding spaces for the dough to be baked are attached by riveting to special supporting bars to form a composite mold. This method requires a relatively large number of work operations and makes the manufacture considerably more expensive.

An object of the present invention is to simplify this manufacture and to reduce the manufacturing costs. The method according to the invention is essentially characterized in that elongated portions of aluminum or other light metal are produced by extrusion, and each portion is cut perpendicularly to its longitudinal axis to form a component having a length corresponding to the length or width of the mold. These components are then assembled by welding or riveting so as to form side walls, end walls and bottom walls defining the partial molds of the composite mold.

In order to increase the rigidity of the composite mold and the partial molds, certain of the elongated portions may be provided during the extrusion operation with at least one reinforcing bead extending longitudinally of the elongated portion, and the components are assembled to form the mold in such a way that the sides provided with beads will form the outer side of the composite mold and/or the partial mold, respectively. Furthermore, other elongated portions may be provided at one side during the extrusion operation with flat longitudinal ridges and the mold is then assembled with the sides having said ridges forming the underside of the bottom wall of a partial mold so that the ridges will reduce friction and wear when the mold is moved on a support.

In order to simplify the manufacture still further elongated portions may be shaped during the extrusion operation with a U-section in order thereby to premanufacture the side and bottom walls of the partial molds, the side members of the U-section being provided on the outside with at least one reinforcing bead extending longitudinally of the elongated portion and the base of the U-section being provided at its underside with flat ridges extending longitudinally of the elongated portion.

Preferred embodiments of molds manufactured according to the invention are shown in the appended drawings, where FIG. 1 shows seen from above a mold according to one embodiment of the invention;

FIG. 2 sows an end elevation view of the end wall of the mold in FIG. 1;

Figure 1:
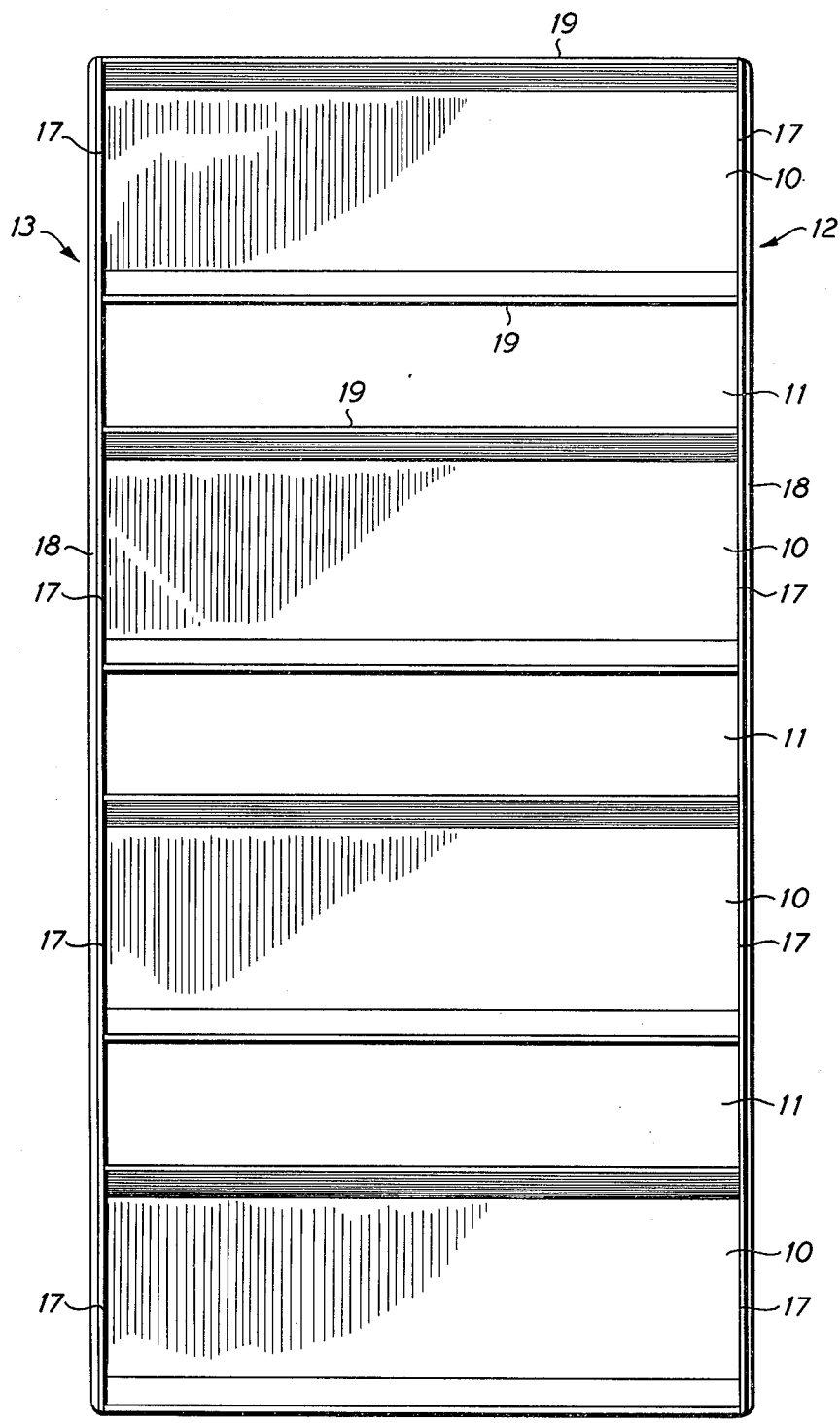

The mold in FIG. 1 contains four rectangular upwardly open partial molds 10 which are arranged in parallel with open interspaces 11. In the embodiment shown the mold is composed of two elongated section bars or portions 12 and 13 produced by extrusion from aluminum or othr light metal, and four short U-sections 14 (FIG. 4) produced by extrusion from aluminum or other light metal, said U-sections forming side walls 15 (FIG. 4) and bottom walls 16 (FIG. 4) of the partial molds 10. At the manufacture the section bars or elongated portions 12, 13 and the extruded U-sections 14 are cut off perpendicularly to their longitudinal axis so as to form blanks corresponding to the length and width, respectively, of the mold, whereupon the ends 17 of the U-sections are united with the bars 12, 13 by riveting or welding so that they are parallel with each other and separated by the open interspaces 11.

Figure 2:
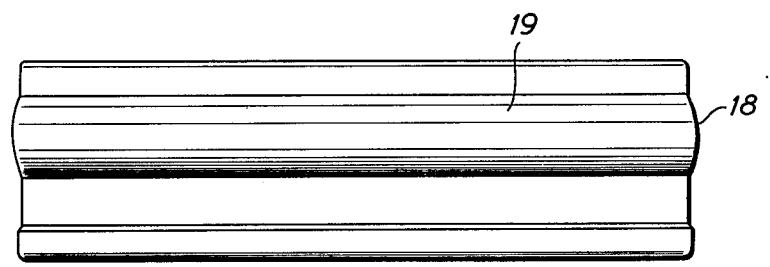
Figure 3:
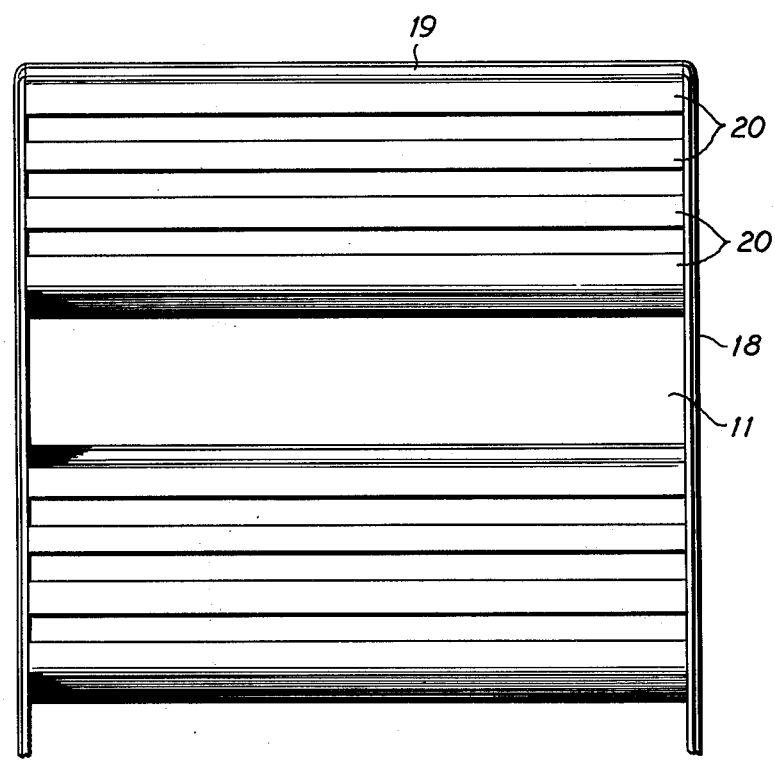
FIG. 3 shows a partial bottom view of the mold in FIG. 1.
Figures 4, 5:
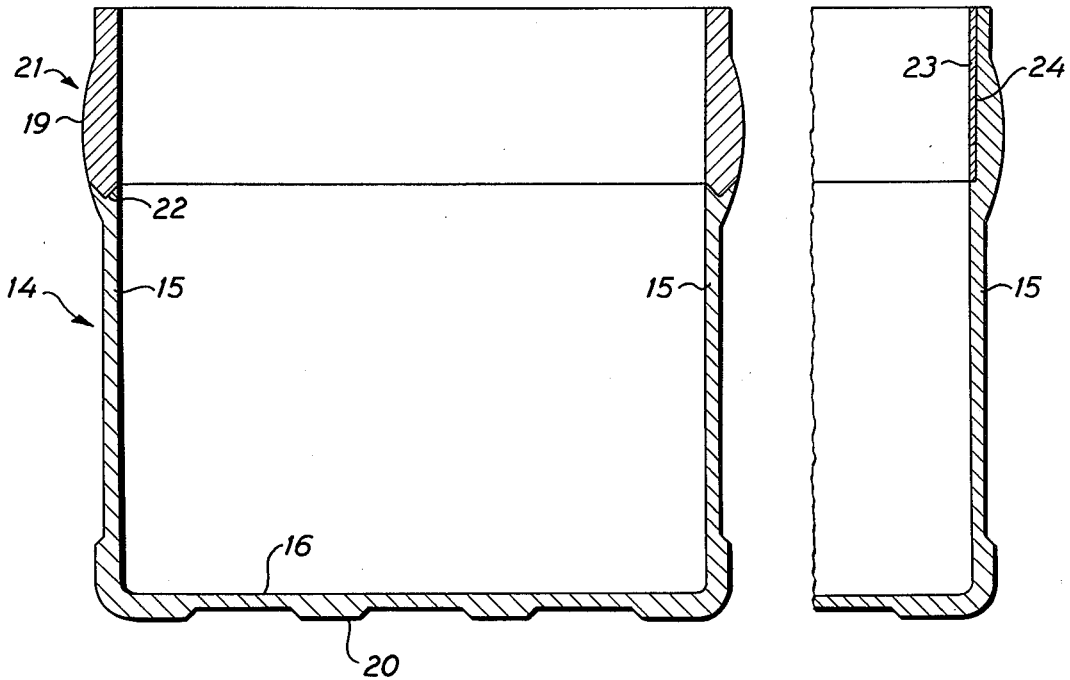
FIG. 4 is a cross section through a mold according to FIG. 1 where the mold is provided with a detachable top.
FIG. 5 shows another embodiment of a mold top having a strip of releasing material at the inside thereof.

As shown by FIGS. 1 and 2, each section bar 12, 13 in the partial molds 10 and each side wall of the U-sections 14, respectively, on the outer sides thereof are provided with reinforcing beads 18 and 19, extending in the longitudinal direction of the bar and the U-section, respectively, and as appears from FIGS. 3 and 4, the base portion of the U-sections 14 forming the bottoms of the partial molds 10 are provided on the underside with flat ridges 20 extending in the longitudinal direction of the U-sections and reducing the friction and wear when the bread mold is moved on a support. Both the beads 18 and 19 and the ridges 20 may be produced at the extrusion of the section bars and the U-sections, respectively.

In the embodiments disclosed in the drawings, the side walls 15 of the partial molds 10 are disposed vertically, but it is to be understood that in a manner known per se the side walls can be arranged to converge towards the bottom 16 of the respective partial mold.

At the fermentation of the dough steam may form between the dough and the upper portion of the mold. As a result of this, the surface finish will wear more quickly in this part of the mold. This may be avoided by using a mold which can be disassembled according to FIGS. 4 and 6 in which case it is only necessary to treat the upper portion of the mold anew when this has lost its releasing ability.

The side and end walls of the mold may be provided in such a case with a detachable attachment or top 21. For retaining the top on the mold the lower margins of the said top and the upper margins of the side walls and end walls of the mold or each partial mold are complementary shaped at 22 (FIG. 4), i.e. there is for instance formed a circumferential, V-shaped protruding portion at the lower edge of the top 21 and a V-shaped groove is formed at the upper edge of the side and end walls of the partial mold or the composite mold. Said V-shaped portion and groove extend also over the empty spaces 11.

According to FIG. 5, instead of having a top for facilitating the maintenance of the mold there may be provided a silicone coated strip material 23 mounted in a recess 24 at the inside of the side and end walls at the upper margin of the partial mold.

Figure 6:
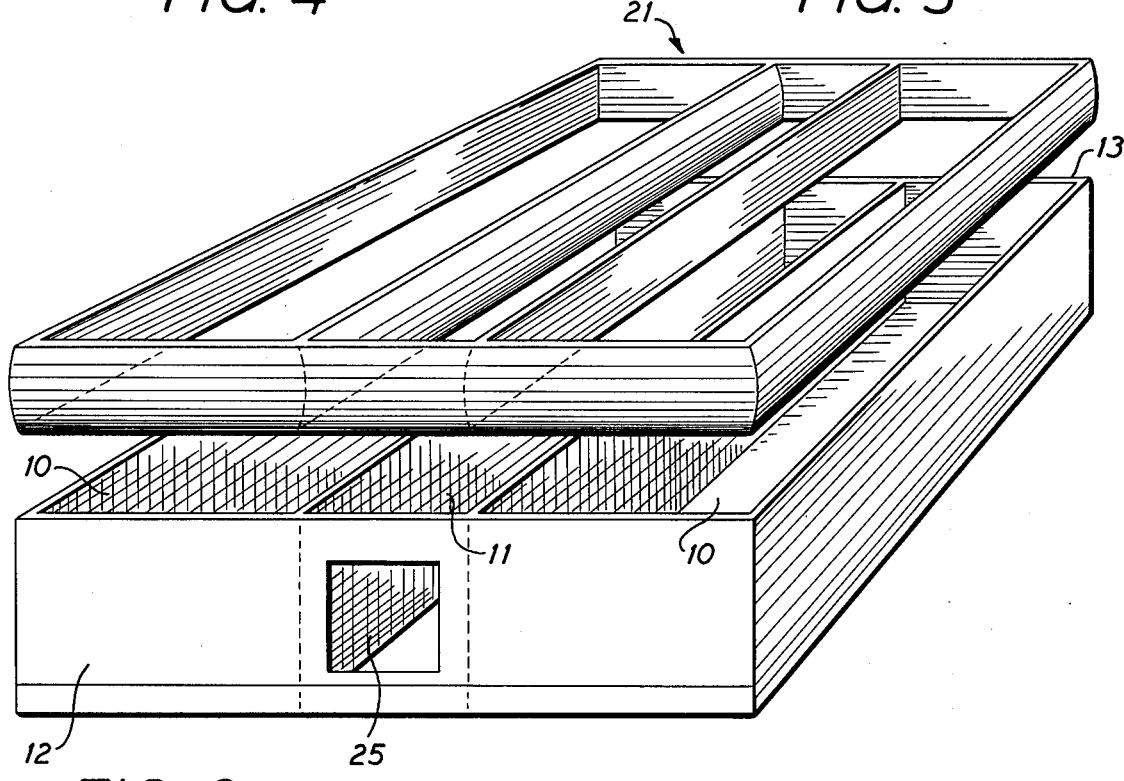
FIG. 6 is a schematic perspective view on a detachable mold of the type disclosed in FIG. 4 and having two partial molds.

As can be seen from FIG. 6 an opening 25 to the empty space 11 is arranged in the portion 12. A corresponding opening is also arranged in the opposite section bar or portion 13. The purpose of the opening is to facilitate the handling of the mold. Similar openings are arranged in the mold according to FIG. 1.

What is claimed is:
1. A method of making a composite baking mold having a plurality of individual mold spaces, said method comprising the steps of extruding light metal to form an elongated bar, extruding light metal to form an elongated section, cutting said bar perpendicular to its longitudinal axis to form a plurality of bars having the same longitudinal dimensions, said longitudinal dimension corresponding to the length of said composite baking mold, cutting said section perpendicular to its longitudinal axis to form a plurality of sections having the same longitudinal dimension, said longitudinal dimension corresponding to the width of said composite baking mold, affixing said sections to said bars at their engagement in a configuration such that said bars are spaced and are parallel to each other and said sections are spaced and are parallel to each other, said sections being disposed perpendicular to said bars and engaging said bars at each end thereof.

2. A method of making a composite mold as in claim 1, wherein said fixing is by riveting.

3. A method of making a mold as in claim 1, wherein said affixing is by welding.

4. A method of making a composite mold according to claim 1, wherein said elongated sections are extruded in a substantially U-shaped cross-section, said U-shaped sections being affixed to said bars with the open side of said U-shape facing upwardly.

5. A method of making a mold as in claim 4, wherein said U-shaped sections are extruded with longitudinal ridges located on the lower surface of the bottom portion thereof.

6. A method according to claim 1, wherein said sections and said bars are extruded with a reinforcing bead located on the side walls thereof.

7. A method according to claim 1, further including the steps of extruding said bars in two separate parts, said parts being detachably connected, and extruding said sections in two separate parts, said section parts being detachably connected.

8. A method according to claim 1, wherein a strip of releasing material is attached to said bars and said sections at the inside top margin of said individual mold spaces.

* * * * *